United States Patent
Farkas et al.

(10) Patent No.: US 9,163,719 B2
(45) Date of Patent: Oct. 20, 2015

(54) ILLUMINATED KNOB FOR A SHIFTER ASSEMBLY AND CORRESPONDING ILLUMINATION METHOD

(71) Applicant: Kongsberg Automotive AB, Mullsjö (SE)

(72) Inventors: Viktor Farkas, Mullsjö (SE); Niklas Säfström, Mullsjö (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 0 days.

(21) Appl. No.: 14/398,670

(22) PCT Filed: May 3, 2013

(86) PCT No.: PCT/IB2013/000844
§ 371 (c)(1),
(2) Date: Nov. 3, 2014

(87) PCT Pub. No.: WO2013/164678
PCT Pub. Date: Nov. 7, 2013

(65) Prior Publication Data
US 2015/0116979 A1    Apr. 30, 2015

Related U.S. Application Data

(60) Provisional application No. 60/642,093, filed on May 3, 2012.

(51) Int. Cl.
*F16H 59/02* (2006.01)
*B60Q 3/02* (2006.01)
(Continued)

(52) U.S. Cl.
CPC ............ *F16H 59/0278* (2013.01); *B60K 20/04* (2013.01); *B60Q 3/024* (2013.01);
(Continued)

(58) Field of Classification Search
USPC ................................... 362/491, 511
See application file for complete search history.

(56) References Cited

U.S. PATENT DOCUMENTS 3,262,224 A    7/1966  Hardesty
5,602,525 A *  2/1997  Hsu ............................. 340/456
(Continued)

FOREIGN PATENT DOCUMENTS

CN    201151365 Y    11/2008
DE    40 40 955 C1    1/1992
(Continued)

OTHER PUBLICATIONS

Machine-assisted English language translation of DE4040955 extracted from www.espacenet.com on May 19, 2015; 14 pages.
(Continued)

*Primary Examiner* — Laura Tso
(74) *Attorney, Agent, or Firm* — Howard & Howard Attorneys PLLC

(57) ABSTRACT

A knob for a shifter assembly of a vehicle includes a housing having an interior surface defining a cavity and an opening. A body is at least partially disposed within the cavity, has first and second surfaces, extends to a periphery, and is formed of an at least partially transparent material. An illumination device is disposed within the cavity for emitting light rays. At least one reflective surface is disposed along the periphery for receiving the light rays. A first portion of the light rays is internally reflected within the body off of the first surface. At least one indicium is disposed along the body. The body defines at least one indicium cavity having a bottom substantially parallel to the first surface with the indicium disposed within the indicium cavity along the bottom for reflecting the first portion of the light rays toward the opening for illuminating the indicium.

20 Claims, 7 Drawing Sheets

(51) Int. Cl.
  *F21V 7/00*     (2006.01)
  *B60K 20/04*    (2006.01)
  *G05G 1/04*     (2006.01)
  *G05G 25/04*    (2006.01)
  *G05G 1/06*     (2006.01)
  *G05G 1/10*     (2006.01)

(52) U.S. Cl.
  CPC . *F21V 7/00* (2013.01); *G05G 1/04* (2013.01); *G05G 25/04* (2013.01); *G05G 1/06* (2013.01); *G05G 1/105* (2013.01)

(56)     References Cited

U.S. PATENT DOCUMENTS

| 2001/0055213 | A1* | 12/2001 | Chien | 362/491 |
| 2004/0095778 | A1  | 5/2004  | Zynda | |
| 2006/0096406 | A1* | 5/2006  | Liu | 74/543 |
| 2006/0123943 | A1* | 6/2006  | Huber et al. | 74/543 |
| 2009/0213603 | A1* | 8/2009  | Lin | 362/491 |

FOREIGN PATENT DOCUMENTS

| DE | 297 12 979 U1    | 9/1997 |
| DE | 10 2009 040162 A1 | 3/2011 |
| EP | 2 492 143 A1     | 8/2012 |
| JP | S 58-45134 U     | 3/1983 |
| JP | S 61-138630 U    | 8/1986 |
| JP | 2007-203823 A    | 8/2007 |

OTHER PUBLICATIONS

Machine-assisted English language abstract of DE29712979U1 extracted from www.espacenet.com on May 19, 2015; 11 pages.
Machine-assisted English language translation of JP2007203823A extracted from www.espacenet.com on May 19, 2015; 14 pages.
Machine-assisted English language translation of CN201151365Y extracted from www.espacenet.com on May 19, 2015 17 pages.
Machine-assisted English language translation of DE102009040162A1 extracted from www.espacenet.com on May 19, 2015 13 pages.
International Search Report of WO2013164680A1 dated Jul. 8, 2013, 4 pages.
International Search Report of WO2013164678A1 dated Jul. 15, 2013, 3 pages.

* cited by examiner

ILLUMINATED KNOB FOR A SHIFTER ASSEMBLY AND CORRESPONDING ILLUMINATION METHOD

RELATED APPLICATION

This application is the National Stage of International Patent Application No. PCT/IB2013/000844, filed on May 3, 2013, which claims priority to and all advantages of U.S. Provisional Patent Application No. 61/642,093, which was filed on May 3, 2012, the contents of which are incorporated herein by reference.

BACKGROUND OF THE INVENTION

1. Field of the Invention

The subject invention generally relates to a knob for a shifter assembly of a vehicle. In particular, the subject invention relates to a unique design to illuminate the knob.

2. Description of Related Art

There is a desire within the industries utilizing shifter assemblies to illuminate a knob of the shifter assembly. Illuminated knobs provide a visual appeal within an interior of a vehicle and can display information to a driver, such as a shift pattern for a transmission of the vehicle. Many techniques have been used to illuminate the knob of the shifter assembly. One solution in the industry involves a knob defining a bore and an opening extending into the bore. The knob includes an illumination device disposed within the bore. A plate is disposed within the cavity between the illumination device and the opening. The plate includes an opaque portion comprising a majority of the plate and a transparent portion comprising a minority of the plate. The transparent portion typically has a configuration corresponding to information that may be desirable to the driver, such as a gear selection layout for the transmission. The illumination device transmits light to the plate. The light is inhibited from passing through the opaque portion. However, the light can pass through the transparent portion. Illumination of the transparent portion displays the information within the configuration of the transparent portion to the driver. Although the light passing through the transparent portion illuminates the knob, the light is unabated through the transparent portion. As a result, the light can greatly illuminate the interior of the vehicle which can be distracting to the driver.

Therefore, there remains an opportunity to develop a knob for a shifter assembly having an aesthetically-pleasing illumination.

SUMMARY OF THE INVENTION AND ADVANTAGES

The subject invention provides for a knob for a shifter assembly of a vehicle. The knob includes a housing having an interior surface defining a cavity and an opening extending into the cavity. A body is at least partially disposed within the cavity and has a first surface and a second surface spaced from one another. The body extends to a periphery and is formed of an at least partially transparent material. The knob includes an illumination device disposed within the cavity between the interior surface of the housing and the body for emitting light rays. The knob includes at least one reflective surface disposed along the periphery of the body for receiving the light rays from the illumination device with a first portion of the light rays reflecting off of the reflective surface and internally reflecting within the body off of the first surface toward the second surface. The knob includes at least one indicium disposed along the body. The body defines at least one indicium cavity having a bottom substantially parallel to the first surface with the indicium disposed within the indicium cavity along the bottom for reflecting the first portion of the light rays toward the opening for illuminating the indicium.

Additionally, the subject invention provides for a shifter assembly for selecting one of a plurality of gears of a transmission of a vehicle. The shifter assembly includes a base, a lever having a first end and a second end opposite one another with the lever movably coupled to the base at the first end, and a knob coupled to the lever at said second end. The knob includes a housing having an interior surface defining a cavity and an opening extending into the cavity. A body is at least partially disposed within the cavity and has a first surface and a second surface spaced from one another. The body extends to a periphery and is formed of an at least partially transparent material. The knob includes an illumination device disposed within the cavity between the interior surface of the housing and the body for emitting light rays. The knob includes at least one reflective surface disposed along the periphery of the body for receiving the light rays from the illumination device with a first portion of the light rays reflecting off of the reflective surface and internally reflecting within the body off of the first surface toward the second surface. The knob includes at least one indicium disposed along the body. The body defines at least one indicium cavity having a bottom substantially parallel to the first surface with the indicium disposed within the indicium cavity along the bottom for reflecting the first portion of the light rays toward the opening for illuminating the indicium.

Furthermore, the subject invention provides for a method for illuminating a knob for a shifter assembly of a vehicle utilizing a housing having an interior surface defining a cavity and an opening extending into the cavity. A body is at least partially disposed within the cavity having a first surface and a second surface spaced from one another with the body extending to a periphery and being formed of an at least partially transparent material. An illumination device is disposed within the cavity between the interior surface and the body. At least one reflective surface is disposed along the periphery of the body. The at least one indicium is disposed along the body, and the body defines at least one indicium cavity having a bottom substantially parallel to the first surface with the indicium disposed within the indicium cavity along the bottom. The method includes the steps of emitting light rays from the illumination device and reflecting the light rays off the reflective surface and within the body. The method further includes the steps of totally internally reflecting a first portion of the light rays within the body toward the indicium, and reflecting the first portion of the light ray off of the indicium and out of the housing through the opening for illuminating the indicium. The method further includes the step of transmitting a second portion of the light rays through the body and out of the housing through the opening for illuminating the periphery of the body.

Accordingly, the subject invention provides for a knob for a shifter assembly that can illuminate which creates a display for a driver. Furthermore, the illumination of the knob has a soft "glowing" affect which appeals to senses of the driver.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1:
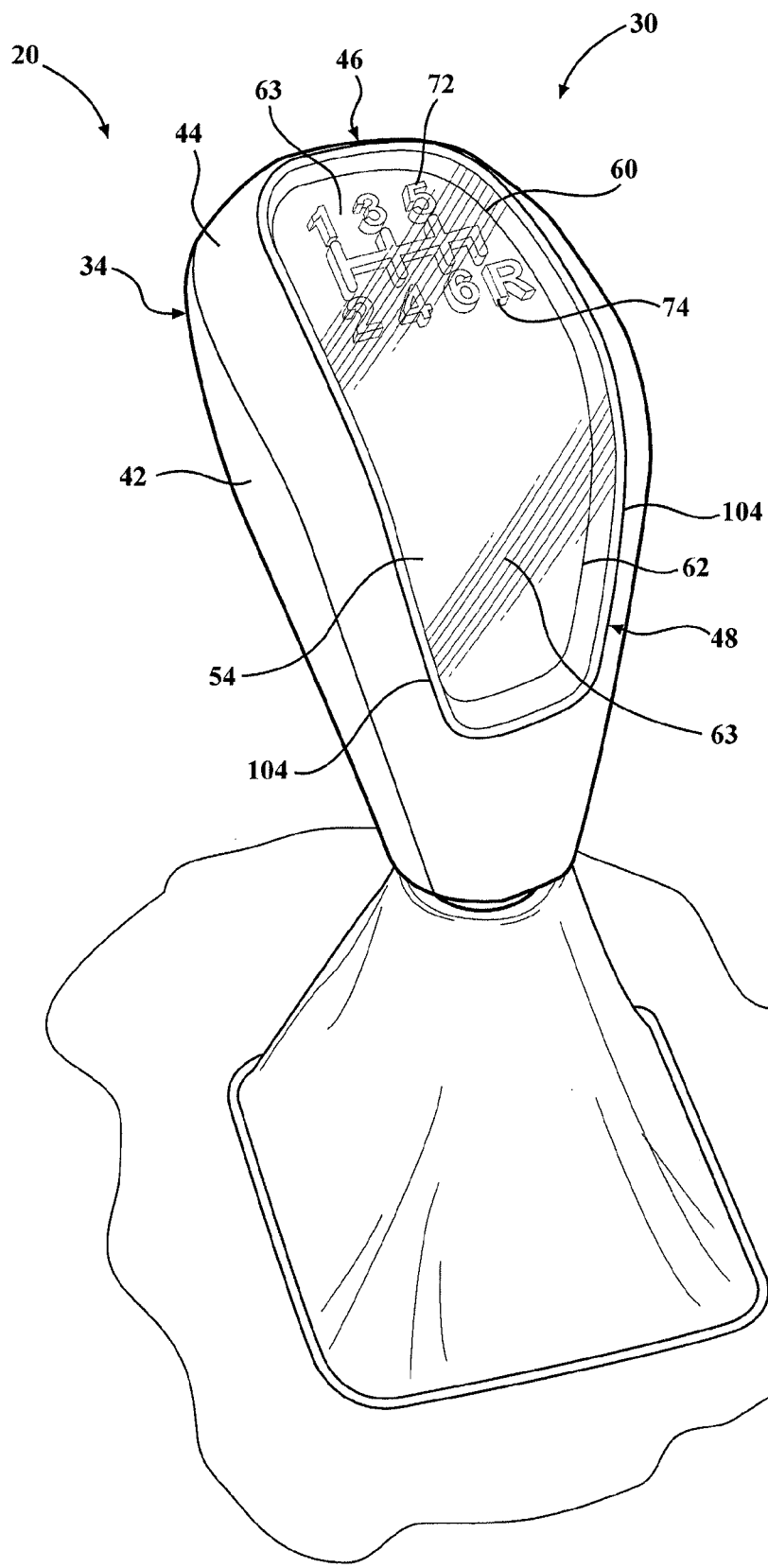
FIG. 1 is a perspective view of a shifter assembly.
Figure 2:
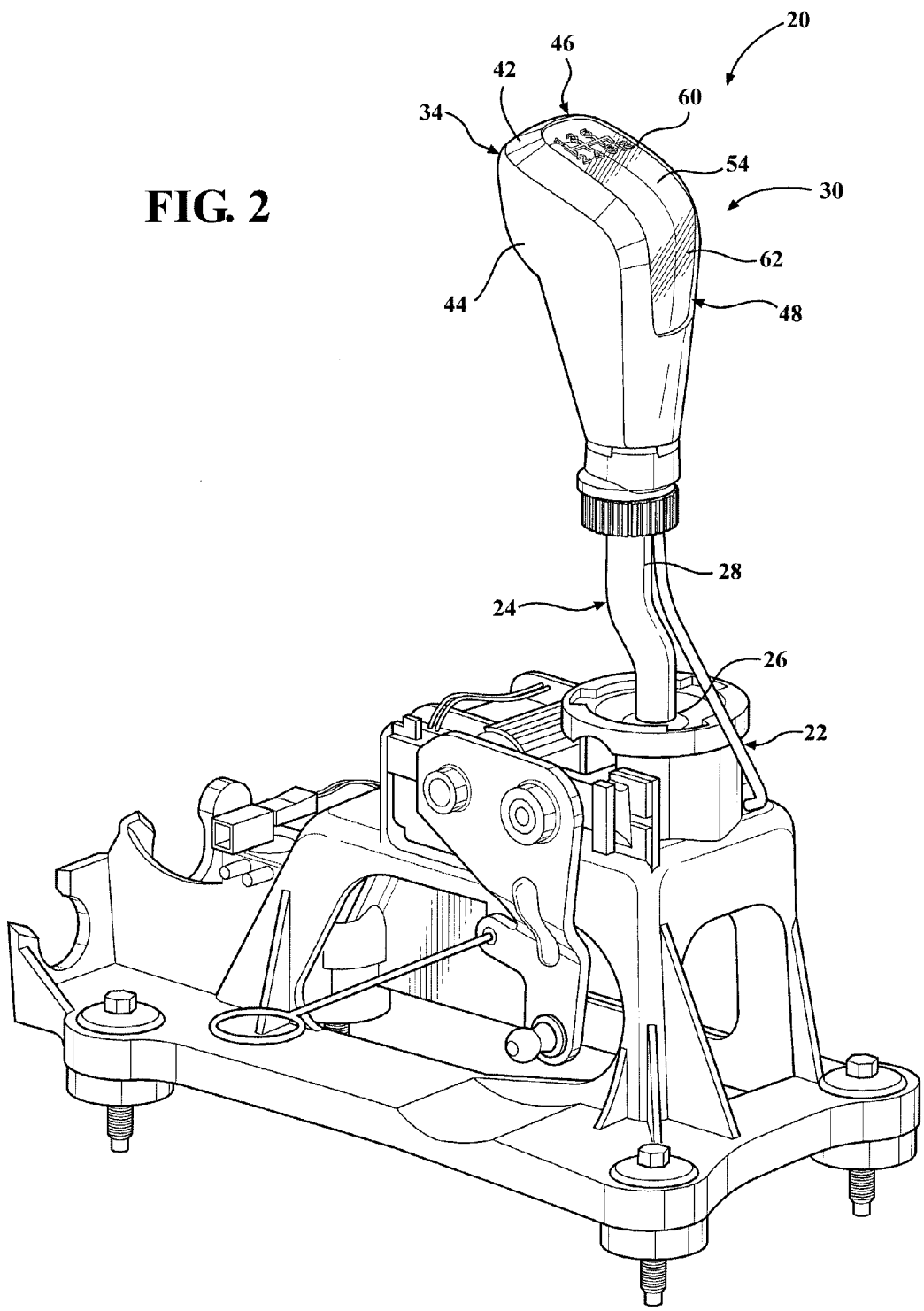
FIG. 2 is a perspective view of the shifter assembly having a base, a lever, and a knob.

Referring to the Figures, wherein like numerals indicate like or corresponding parts throughout the several views, a shifter assembly 20 for selecting one of a plurality of gears of a transmission of a vehicle is generally shown in FIGS. 1 and 2. The shifter assembly 20 can be utilized as a cable-operated shifter assembly and as a shift-by-wire shifter assembly, as known in the art. However, it is to be appreciated that the shifter assembly 20 can be utilized in any suitable manner to select one of the plurality of gears of the transmission of the vehicle. For illustrative purposes only, the following disclosure is focused on the shifter assembly 20 utilized in an automotive application (i.e., the vehicle); however, it should be appreciated that the shifter assembly 20 may be used in any other appropriate application, including non-vehicular assemblies, without deviating from the scope of the subject invention.

As shown in FIG. 2, the shifter assembly 20 includes a base 22. The base 22 is fixed to a console of the vehicle. However, the base 22 can be fixed to a floor of the vehicle, a steering column of the vehicle, or any other location of the vehicle for selecting one of the gears of the transmission without departing from the scope of the subject invention. The base 22 can be fixed to the vehicle by bolts, screws, clips, or any other suitable fastener.

The shifter assembly 20 includes a lever 24 having a first end 26 and a second end 28 opposite one another with the lever 24 movably coupled to the base 22 at the first end 26. The lever 24 is movable relative to the base 22 either pivotably or linearly. However, it is to be appreciated that the lever 24 can be movably coupled to the base 22 in any suitable configuration.

The shifter assembly 20 includes a knob 30 coupled to the lever 24 at the second end 28. The knob 30 defines a bore with the second end 28 of the lever 24 disposed within the bore. However, the knob 30 can abut and be coupled to the lever 24 at the second end 28. It is to be appreciated that the knob 30 can be coupled to the second end 28 of the lever 24 in any suitable configuration.

Figure 3:
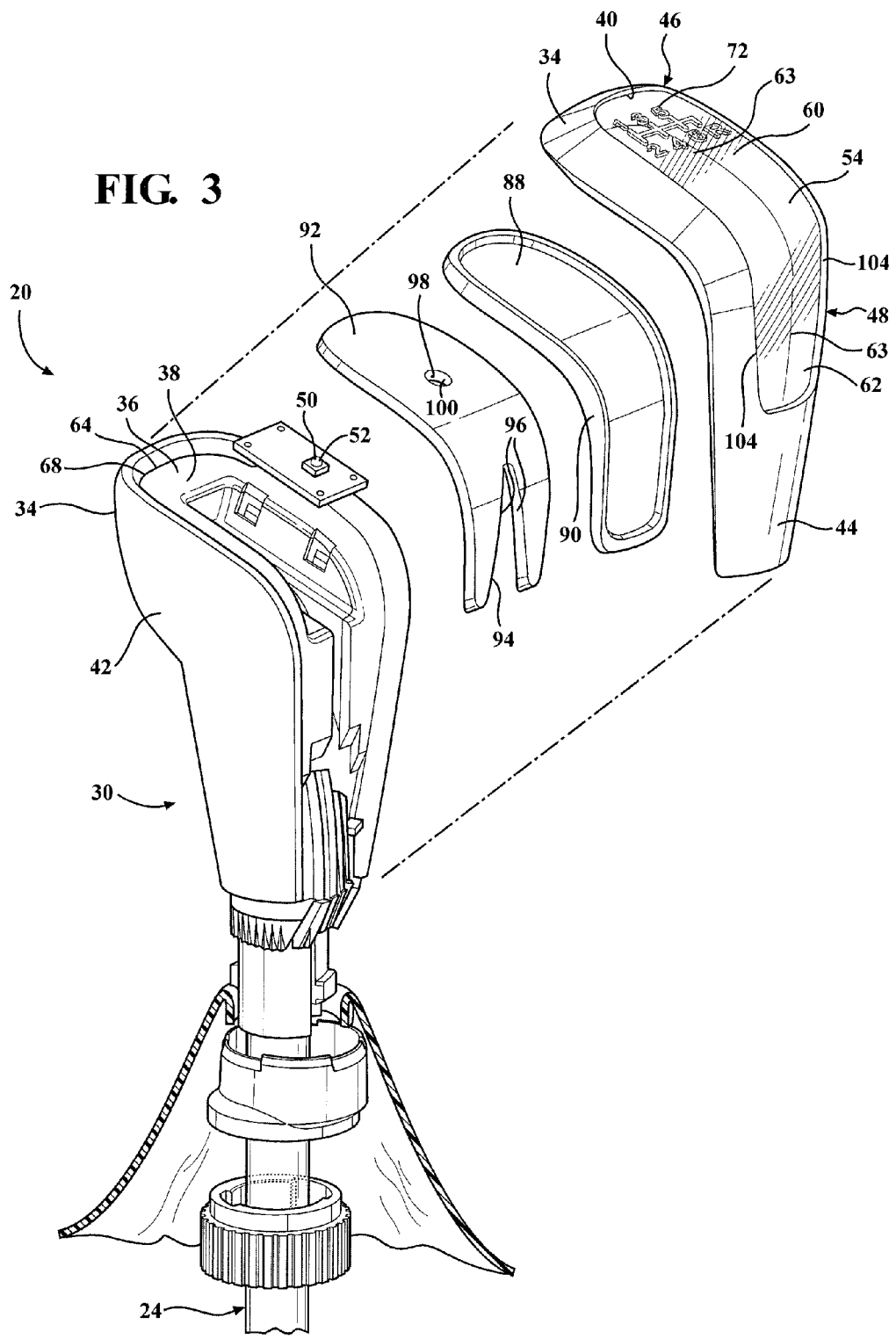
FIG. 3 is an exploded view of the knob.

As shown in FIG. 3, the knob 30 includes a housing 34 having an interior surface 36 defining a cavity 38 and an opening 40 extending into the cavity 38. More specifically, the housing 34 includes a first housing section 42 and a second housing section 44 with both the first and second housing sections 42, 44 defining the cavity 38. Furthermore, the second housing section 44 defines the opening 40. The housing 34 defines a top 46 and a side 48 adjacent one another. The top 46 is disposed opposite the lever 24 with the side 48 extending from the top 46 toward the lever 24. The opening 40 is defined by the top 46 and side 48 of the housing 34 such that opening 40 extends between both the top 46 and the side 48. It is to be appreciated that the opening 40 can have any configuration defined by the housing 34 without escaping the scope of the subject invention.

The knob 30 includes an illumination device 50 disposed within the cavity 38 for emitting light rays. The light rays are emitted from the illumination device 50 in a plurality of orientations. The illumination device 50 is further defined as a light emitting diode 52 configured to emit the light rays. Alternatively, the illumination device 50 can be a laser or a plurality of laser with the laser(s) emitting the light rays in phase with one another. Furthermore, the illumination device 50 can be an incandescent bulb. It is to be appreciated that the illumination device 50 can be any suitable configuration for emitting light rays without escaping the scope of the subject invention.

The knob 30 includes a body 54 at least partially disposed within the cavity 38 having a first surface 58 and a second surface 76 spaced from one another with the body 54 extending to a periphery 56 and being formed of an at least partially transparent material. The body 54 is formed of a transparent material such as polycarbonate (PC) or polymethyl methacrylate (PMMA). However, it is to be appreciated that the body 54 can be formed of any at least partially transparent material without escaping the scope of the subject invention. The body 54 is optimally completely transparent; however, it is to be appreciated that the body 54 can be any transparency through which the light rays can transmit.

Figure 7:
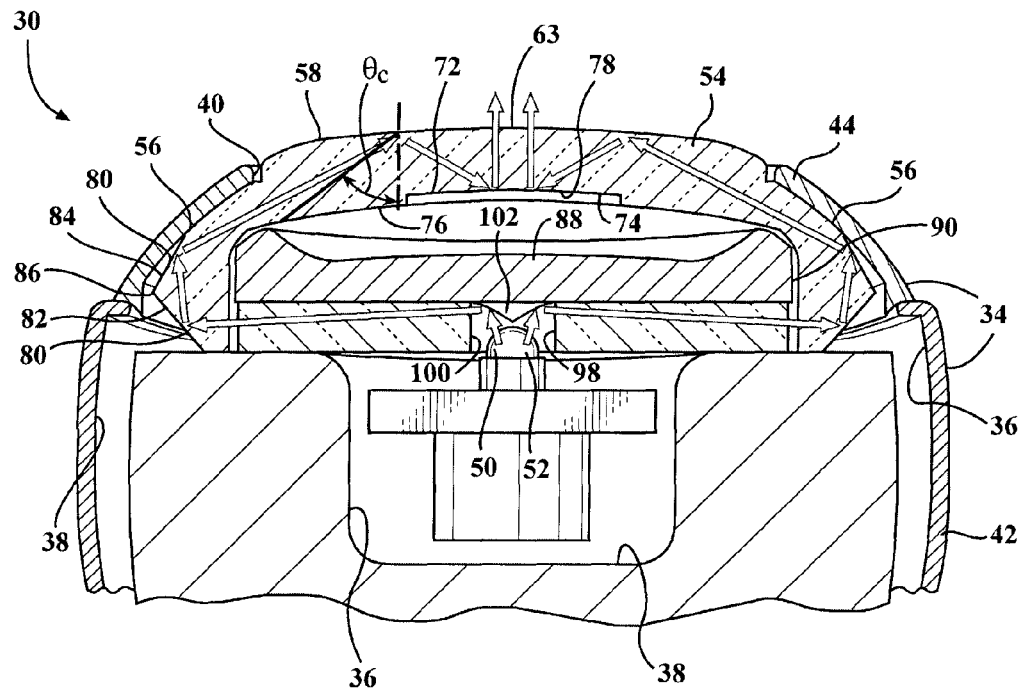
FIG. 7 is a cross-sectional view of the knob with the illumination device emitting a first portion of a plurality of light rays in a plurality of orientations from the illumination device with the Figure illustrating the general path of the first portion.

The illumination device 50 is disposed between the interior surface 36 of the housing 34 and the body 54, as shown in FIGS. 3 and 7. The body 54 is disposed between the opening 40 and the illumination device 50. As shown in FIG. 3, the body 54 extends into the opening 40 such that the body 54 fills the opening 40. However, it is to be appreciated that the body 54 can be disposed entirely within the cavity 38. As shown in FIG. 7, the body 54 has the first surface 58 facing the opening 40 of the housing 34. The first and second surfaces 58, 76 are substantially parallel to one another. The first surface 58 extends to the periphery 56. The body 54 is disposed adjacent the second housing section 44. However, it is to be appreciated that the second housing section 44 and the body 54 can be spaced from and independent of each other without escaping the scope of the subject invention.

Figure 4:
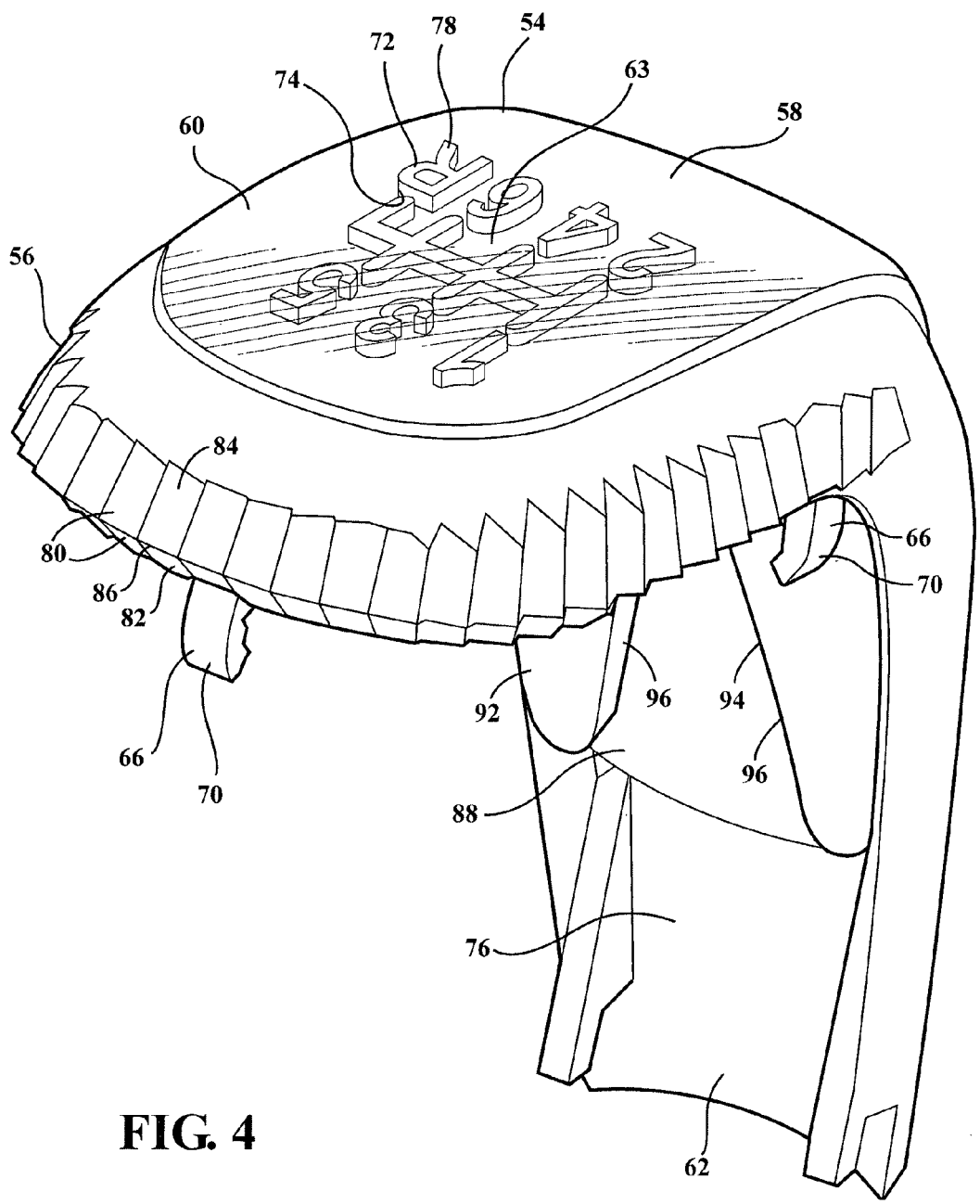
FIG. 4 is a perspective view of a body, a shield, and a light guide of the knob.

As shown in FIG. 4, the body 54 defines a primary section 60 disposed along the top 46 of the housing 34 and a secondary section 62 disposed along the side 48 of the housing 34. The primary section 60 and the secondary section 62 of the body 54 are disposed transverse to each other defining a contoured configuration of the body 54 along the top 46 and the side 48 of the housing 34. The contoured configuration includes a curved transition between the primary and secondary sections 60, 62. It is to be appreciated that the contoured configuration can include an angular transition between the first and second portions or any other transition between the primary and secondary sections 60, 62 without escaping the scope of the subject invention.

The housing 34 defines a first retaining feature 64, as shown in FIG. 3, and the body 54 defines a second retaining feature 66, as shown in FIG. 4 with the first and second retaining features 64, 66 engaging each other to couple the body 54 to the housing 34. More specifically, the first housing section 42 defines the first retaining feature 64. The first retaining feature 64 is further defined as a channel 68 and the second retaining feature 66 is defined as a plurality of clips 70 extending into the channel 68. The clips 70 engage the first housing section 42 within the channel 68 to couple the body 54 to the housing 34. As shown in FIG. 3, the second housing section 44 is disposed over the body 54. The second housing section 44 is coupled to the first housing section 42 by a snap-fit mechanism. However, the first and second housing sections 42, 44 can be coupled to each other by mechanical fasteners, gluing, chemical-bonding, over-molding, or the like without escaping the scope of the subject invention. Furthermore, it is to be appreciated that second housing section 44 can be coupled to the body 54 and therefore be indirectly coupled to the first housing section 42 through the coupling between the body 54 and the first housing section 42.

Figure 5:
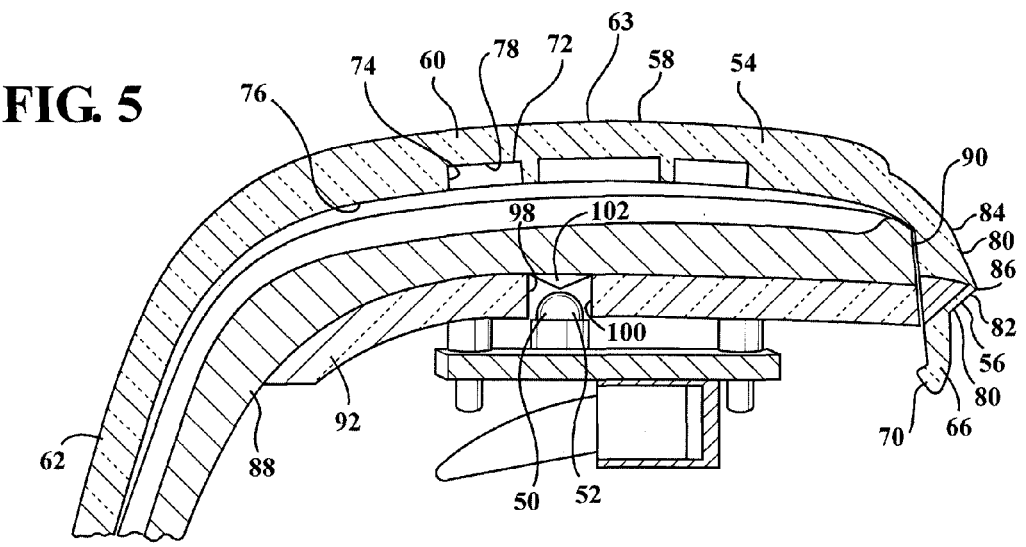
FIG. 5 is a cross-sectional view of an illumination device of the knob, and the body, the shield, and the light guide.

As shown in FIG. 4, the knob 30 includes at least one indicium 72 disposed along the body 54. As shown in FIG. 5, the body 54 defines at least one indicium cavity 74 with the indicium 72 disposed within the indicium cavity 74. Specifically, the body 54 has the second surface 76 opposite the first surface 58 with the indicium cavity 74 extending inwardly toward the first surface 58 from the second surface 76. The indicium cavity 74 has a bottom 78 substantially parallel to the first surface 58 of the body 54 with the indicium 72 disposed along the bottom 78. More specifically, the bottom 78 is substantially parallel to a proximate portion of the first surface 58. The indicium 72 have a coarse textural configuration for scattering the light rays. The coarse textural configuration of the indicium 72 can be achieved by etching, abrasive blasting, or any other suitable process. Furthermore, the indicium 72 may be a film, coating, or any other suitable material disposed on the body 54 for scattering the light rays.

The indicium 72 correlate to various gear positions of the transmission. As shown in FIG. 1, the indicium 72 define an indicium pattern correlating to the orientation or order of the gear positions for the transmission of the vehicle, which are selected through movement of the lever 24 relative to the base 22 in accordance with the order of the gear positions. For example, the indicium 72 and indicium pattern may represent gear positions for a manual transmission. As shown, gears 1, 2, 3, 4, 5, 6 and R are represented, which is a common shift pattern for a six-speed manual transmission, including gears one through six and reverse gear, respectively. The indicium 72 may alternatively include P, R, N, D, L, which represent park, reverse, neutral, drive, and low gear, respectively. These latter indicium 72 would be utilized in a vehicle having an automatic transmission. It is to be appreciated that any combination of indicium 72 and indicium pattern may be utilized without deviating from the scope of the subject invention.

It is to be appreciated that the indicium 72 can be disposed anywhere within the indicium cavity 74. Alternatively, it is to be appreciated the indicium 72 can be disposed anywhere on the second surface 76. As shown in FIG. 4, the indicium 72 are disposed on the primary section 60 of the body 54. However, it is to be appreciated that the indicium 72 can be disposed on the secondary section 62 of the body 54. The purpose of the indicium 72 and the scattering of the light rays by the indicium 72 will be better understood through further discussion below.

Figure 6:
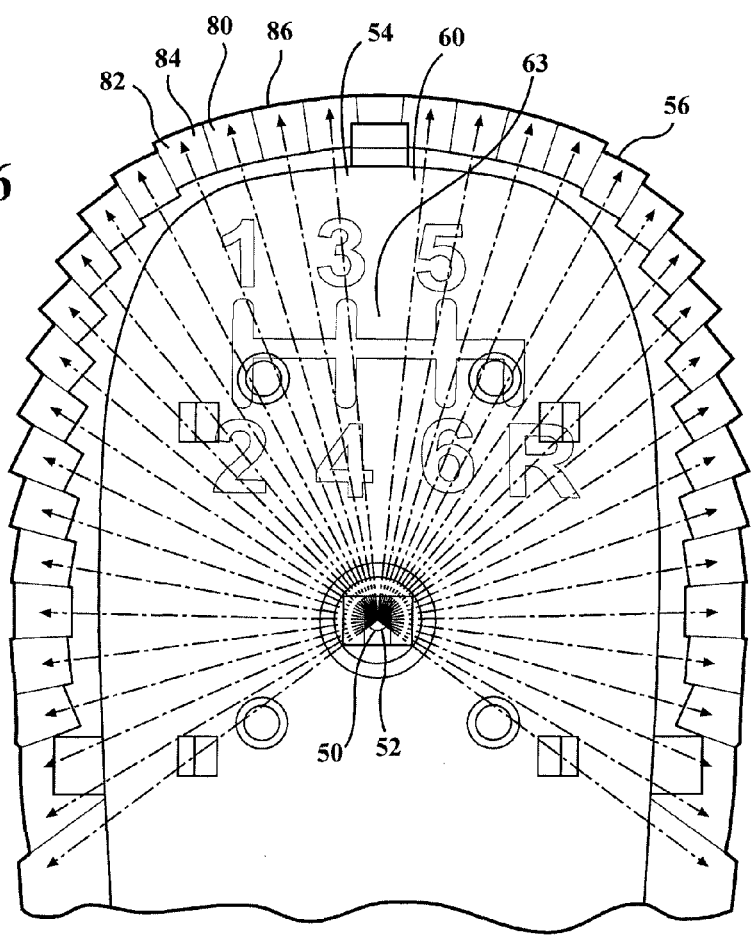
FIG. 6 is a plan view of a primary section of the body.

As shown in FIG. 6, the knob 30 includes at least one reflective surface 80 disposed along the periphery 56 of the body 54. The reflective surface 80 is integral with the body 54 for transmitting the light rays within the body 54. More specifically, the reflective surface 80 is comprised of the same material as the body 54. The reflective surface 80 defines a portion of the periphery 56 of the body 54. It is to be appreciated that the reflective surface 80 can be a unique component materially distinguished from the body 54 such as a film, coating, substrate, and the like that can be applied to, or embedded within the body 54, along the periphery 56. It is also to be appreciated that the reflective surface 80 can be spaced from the periphery 56 without escaping the scope of the subject invention.

Figure 9:
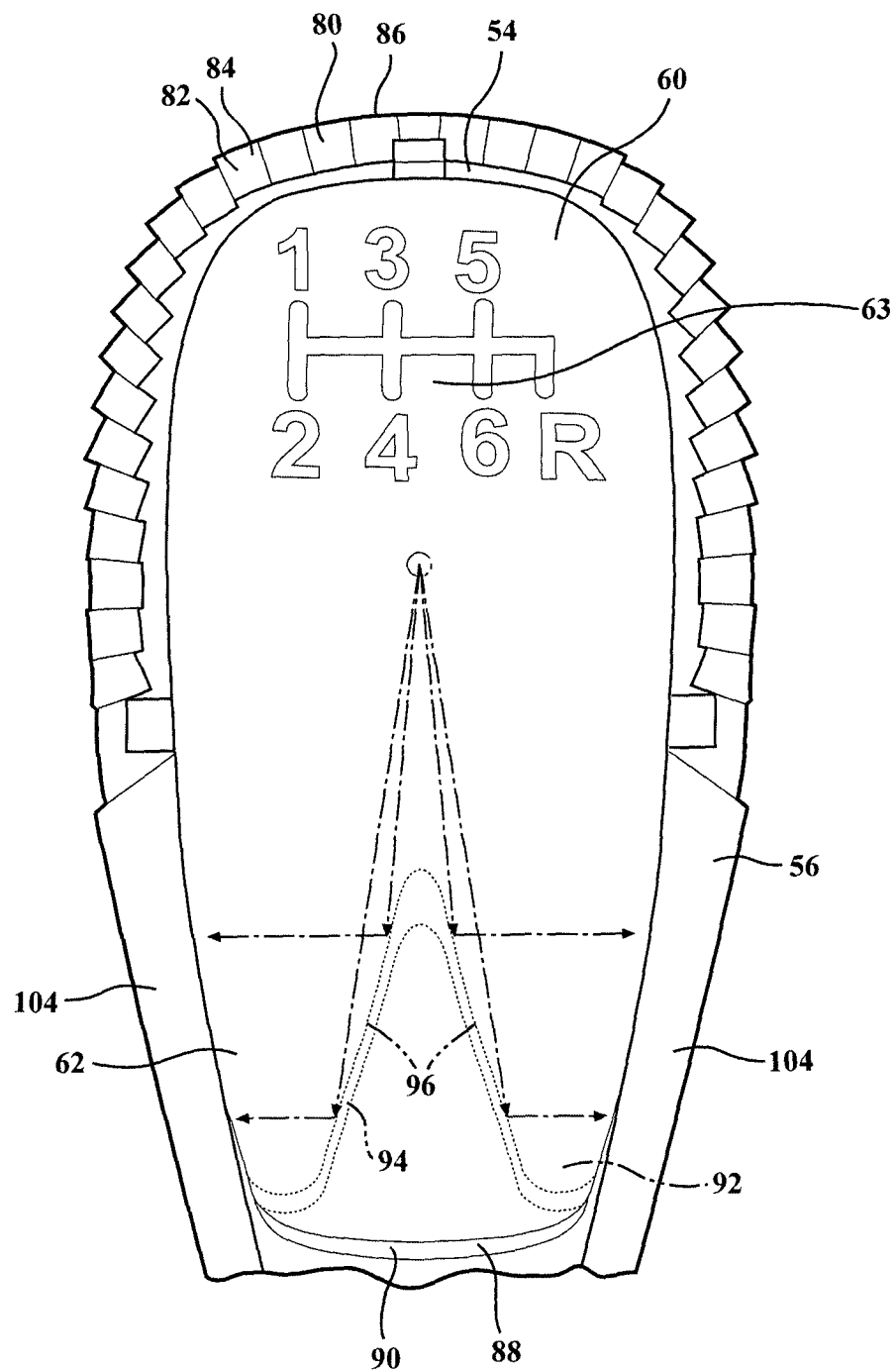
FIG. 9 is a plan view of the body, the shield, and the light guide with the light guide reflecting the light rays.

As shown in FIG. 9, the reflective surface 80 is further defined as a plurality of reflective surfaces 80 disposed and staggered about the periphery 56 of the body 54. The body 54 defines a central region 63 within the periphery 56 with each of the plurality of reflective surfaces 80 angled toward the central region 63. Said differently, each reflective surface 80 is respectively oriented to face the central region 63. The indicium 72 are disposed in the central region 63. More specifically, the indicium cavity 74 is defined in the central region 63. The central region 63 extends between the primary and secondary sections 60, 62. As shown in FIG. 9, the indicium 72 are disposed in the central region 63 that is disposed in the primary section 60. The indicium 72 can be disposed in the central region 63 that is disposed in the secondary section 62. It is to be appreciated that the indicium 72 can be disposed anywhere in the central region 63 without escaping the scope of the subject invention.

A majority of the plurality of reflective surfaces 80 are disposed about the periphery 56 of the primary section 60 of the body 54. A minority of the plurality of reflective surfaces 80 are disposed about the periphery 56 of the secondary section 62 of the body 54. More specifically, a single, continual reflective surface 80 is disposed about the periphery 56 of the secondary section 62 of the body 54. It is to be appreciated that the reflective surfaces 80 can be evenly distributed about the periphery 56 of the secondary section 62 such that the reflective surfaces 80 are staggered about periphery 56 of each of the primary and secondary sections 60, 62. It is also to be appreciated that a majority of the reflective surfaces 80 can be disposed about the periphery 56 of the secondary section 62 and a minority of the reflective surfaces 80 can be disposed about the periphery 56 of the primary section 60. The reflective surfaces 80 described above can have any configuration, orientation, and distribution about the primary and secondary sections 60, 62 without escaping the scope of the subject invention.

As shown in FIG. 7, the reflective surface 80 is further defined as a first reflective surface 82 and a second reflective surface 84 adjacent one another with the first and second reflective surfaces 82, 84 angularly configured to reflect the light rays within the body 54. More specifically, each reflective surface 80 is further defined as the first reflective surface 82 and the second reflective surface 84. The first and second reflective surfaces 82, 84 abut each other and define a corner 86 with the light rays reflecting off each of the first and second reflective surfaces 82, 84 at the corner 86 and within the body 54. Each pair of first and second reflective surfaces 82, 84 are angled as a unit toward the central region 63. The reflection of the light rays by the first and second reflective surfaces 82, 84 into the body 54 will be better understood through further discussion below.

As shown in FIGS. 3 and 7, the knob 30 includes a shield 88 disposed within the cavity 38 and being formed of an at least partially opaque material for inhibiting the light rays from transmitting through the shield 88 toward the opening 40. Optimally, the shield 88 is formed of any material through which the light rays cannot transmit.

As shown in FIG. 7, the shield 88 is disposed between the illumination device 50 and the opening 40 for guiding the light rays toward the periphery 56 of the body 54 by inhibiting the light rays from transmitting into the body 54 away from the periphery 56. Furthermore, the shield 88 is disposed between the illumination device 50 and the body 54. The shield 88 extends substantially parallel to the body 54. More specifically, the shield 88 follows the contoured configuration of the body 54 and extends toward the periphery 56 of the body 54. The shield 88 inhibits the light rays from the illumination device 50 from transmitting directly through the body 54 and the opening 40. In particular, the shield 88 inhibits light rays from transmitting through the body 54 directly around the indicium 72. The purpose of the shield 88 inhibiting the light rays from transmitting directly through the body 54 will be better understood through further discussion below.

The shield 88 defines an outer wall 90 spaced from the interior surface 36 of the housing 34 with the periphery 56 of the body 54 disposed between the outer wall 90 and the interior surface 36 for facilitating transmission of the light rays from the illumination device 50 into the body 54 at the periphery 56. Furthermore, the periphery 56 extends past the outer wall 90 and into the cavity 38 between the interior surface 36 and the shield 88. Light rays that are transmitted toward the shield 88 are inhibited from passing through the shield 88. Light rays that transmit substantially parallel to the shield 88 (i.e. toward the periphery 56 of the body 54) are reflected by the reflective surface 80 into the body 54.

As shown in FIGS. 3 and 7, the knob 30 includes a light guide 92 adjacent the illumination device 50 with the light guide 92 directing the light rays from the illumination device 50 toward the reflective surface 80 for illuminating each of the indicium 72 and the periphery 56 of the body 54, as will be described in greater detail below. The light guide 92 is formed of an at least partially transparent material for facilitating transmission of the light rays through the light guide 92 toward the reflective surface 80. The light guide 92 is formed of a transparent material such as polycarbonate (PC) or polymethyl methacrylate (PMMA). However, it is to be appreciated that the light guide 92 can be formed of any at least partially transparent material without escaping the scope of the subject invention. The body 54 is optimally completely transparent; however, it is to be appreciated that the body 54 can be any transparency through which the light rays can transmit.

As shown in FIG. 7, the shield 88 is disposed between the light guide 92 and the opening 40. The light guide 92 extends substantially parallel to each of the body 54 and the shield 88. More specifically, both the shield 88 and the light guide 92 follow the contoured configuration of the body 54 and extend toward the periphery 56 of the body 54. Said differently, the light guide 92 extends along each of the primary and secondary sections 60, 62 of the body 54.

As discussed above, the periphery 56 of the body 54 extends past the shield 88. The light guide 92 extends along the shield 88 toward the periphery 56 with the light guide 92 adjacent the periphery 56. The first and second reflective surfaces 82, 84 face the light guide 92.

As discussed above, the light guide 92 extends along the secondary section 62 of the body 54, as shown in FIG. 9. The light guide 92 defines a notch 94 proximate the secondary section 62 of the body 54. The light guide 92 has a pair of notch surfaces 96 disposed within the notch 94. The notch surfaces 96 are integral with the light guide 92. The purpose of the notch 94 and the notch surfaces 96 will be better understood through further discussion below.

As shown in FIG. 7, the light guide 92 defines a hole 98 extending toward the shield 88. The illumination device 50 extends into the hole 98 toward the shield 88. The light guide 92 has an entrance surface 100 within the hole 98. The light guide 92 emits the light rays within the hole 98 with the light rays transmitting through the entrance surface 100 in the light guide 92. The light guide 92 directs the light rays along the shield 88 toward the reflective surface 80 for illuminating each of the indicium 72 and the periphery 56 of the body 54, as will be described in greater detail below. Said differently, a segment of the light rays transmitted into the light guide 92 transmit directly through the light guide 92 to the periphery 56 of the body 54. Another segment of the light rays transmitted into the light guide 92 are internally reflected within the light guide 92 to the periphery 56.

Figure 8:
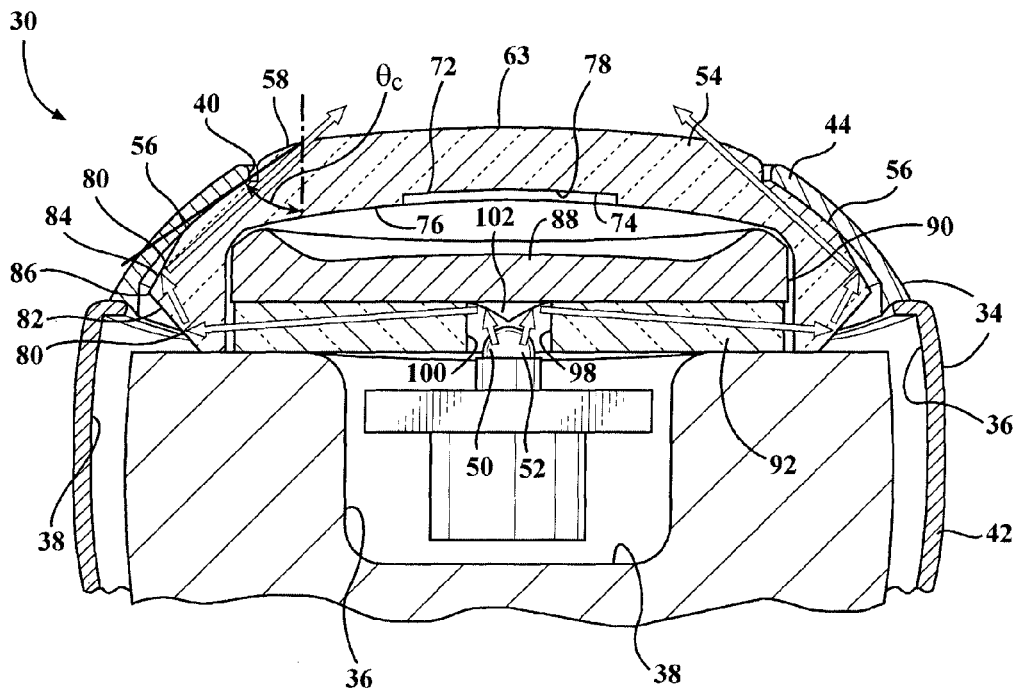
FIG. 8 is a cross-sectional view of the knob with the illumination device emitting a second portion of the plurality of light rays in a plurality of orientations from the illumination device with the Figure illustrating the general path of the second portion.

Internal reflection, commonly referred to as total internal reflection in the art, refers to the phenomena in which light rays transmitting through a material reflect back into the material upon reaching a boundary between the material and yet another material, rather than transmitting through the boundary and into the other material. Whether the light ray internally reflects within the material or transmits through the boundary into the other material depends upon the angle at which the light ray strikes the boundary layer. In order for the light ray to internally reflect, the light ray must transmit through the material at an angle more than a critical angle $\theta_c$ of the material being utilized, as generally illustrated in FIG. 7. If the light ray transmits through the material at an angle less than the critical angle $\theta_c$ of the material being utilized, the light ray will pass through the boundary, as generally illustrated in FIG. 8. The critical angle $\theta_c$ is measured from a line perpendicular to the boundary (also referred to as a normal). The critical angle $\theta_c$ of a material is calculated using the following formula:

$$\theta_c = \arcsin[(\text{refractive index of air}) \div (\text{refractive index of the material})]$$

As an example, as set forth above, the body 54 and the light guide 92 are formed of the at least partially transparent material. The body 54 and the light guide 92 can be formed of polycarbonate (PC). The refractive index of polycarbonate has a range of 1.584-1.586, which can be inserted into the formula above to calculate the critical angle $\theta_c$ for the light ray in the polycarbonate.

It is to be appreciated that henceforth the term internal reflection refers to at least one reflection of the light ray within the material. It is to be appreciated that following the one reflection, the light ray may transmit through the boundary of the material.

Returning to the subject invention, whether the light rays transmit directly through the light guide 92 to the periphery 56 or internally reflect within the light guide 92 to the periphery 56 depends upon the angle at which the light ray enters the light guide 92 within the hole 98. In either event, the light rays transmit out of the light guide 92 and into the periphery 56 of the body 54. The light rays reflect off each of the first and second reflective surfaces 82, 84. It is to be appreciated that a segment of the light rays will transmit through the light guide 92 and into the cavity 38 where the light ray will be absorbed by one of the shield 88 and the housing 34.

The knob 30 includes a mirror 102 disposed within the cavity 38 adjacent the light guide 92. Specifically, the mirror 102 extends from the shield 88 into the hole 98 of the light guide 92. The mirror 102 is spaced from the illumination device 50, but the mirror 102 can alternatively abut the illumination device 50. The mirror 102 is adapted to reflect the light rays from the illumination device 50 with a majority of the reflected light rays transmitting into the light guide 92 for illuminating the indicium 72 and the periphery 56 of the body 54, as will be described in greater detail below. The mirror 102 has a substantially conical configuration with the light rays transmitted from the illumination device 50 toward minor 102 reflecting off the conically configured mirror 102 and the majority of the light rays transmitting through the entrance surface 100 into the light guide 92.

The operation of illuminating the knob 30 of the shifter assembly 20 will be discussed below for illustrative purposes only. Specifically, the operation of illuminating the indicium 72 and the periphery 56 of the body 54 will be set forth below.

As shown in FIG. 6, the illumination device 50 emits light rays in plurality of orientations. As generally illustrated in FIG. 7, the light rays emitted toward the entrance surface 100 of the light guide 92 transmit into the light guide 92. The light rays emitted toward the shield 88 reflect off the mirror 102 with the majority of light rays reflected off of the mirror 102 transmitting into the light guide 92 through the entrance surface 100.

The illumination device 50 transmits the light rays to each of the primary and secondary sections 60, 62 of the body 54. More specifically, the light rays transmitted into the light guide 92 transmit directly through or are internally reflected within the light guide 92 toward the periphery 56 of the body 54. The light rays are transmitted through the light guide 92 to each of the primary and secondary sections 60, 62 of the body 54.

The light rays transmit into the periphery 56 of the primary section 60 of the body 54. The first portion of the light rays reflect off of the reflective surface 80 and internally reflect within the body 54 off of the first surface 58 toward the second surface 76. More specifically, the light rays reflect off each of the first and second reflective surfaces 82, 84 such that the light rays reflect around the shield 88 and toward the first surface 58 of the body 54. The first portion of the light rays internally reflect off of the first surface 58 toward the indicium 72.

As set forth above, the body 54 defines the at least one indicium cavity 74 with the indicium 72 disposed within the indicium cavity 74 for reflecting the first portion of the light rays toward the opening 40. Moreover, the indicium cavity 74 has the bottom 78 substantially parallel to the second surface 76 of the body 54 with the indicium 72 disposed along the bottom 78 for reflecting the first portion of the light rays toward the opening 40 for illuminating the indicium 72. Said differently, the indicium 72 receive the first portion of the light rays. As described above, the indicium 72 have a coarse textural configuration to reflectively scatter the first portion of the light rays toward the opening 40 for illuminating the indicium 72. Said differently, the coarse textural configuration of the indicium 72 facilitates random orientation of the light rays reflecting off the indicium 72. The scattering of the light rays off the indicium 72 facilitates transmission of the first portion of the light rays out of the body 54 and through the opening 40 for illuminating the indicium 72. Furthermore, the scattering of the light rays can create a soft "glowing" affect to the indicium 72 that can be aesthetically-pleasing.

As set forth above, and as shown in FIG. 6, the illumination device 50 emits light rays in the plurality of orientations. The reflective surfaces 80 are staggered about the periphery 56 of the primary section 60 and accept the plurality of light rays emitted in the plurality of orientations. Each of the reflective surfaces 80 are angled toward the central region 63 for facilitating the reflection of the first portion of the light rays toward the central region 63, which maximizes the light rays transmitted to the central region 63. As such, the plurality of reflective surfaces reflect the first portion of the light rays toward the central region 63 for illuminating the indicium 72 from about the periphery 56.

As generally illustrated in FIG. 8, a second portion of the light rays transmit through the body 54 toward the opening 40 for illuminating the periphery 56 of the body 54. Said differently, the second portion of the light rays reflect off each of the first and second reflective surfaces 82, 84 and transmit directly through the body 54 and out of the body 54. The transmission of the second portion through the opening 40 illuminates the periphery 56 of the primary section 60 of the body 54 which can be aesthetically-pleasing.

As described above, the shield 88 inhibits direct transmission of the light rays through the shield 88 and the body 54. In doing so, the light rays do not transmit from the illumination device 50 and around the indicium 72, which is commonly referred to in the art as backlighting. The transmission of the light rays around the indicium 72 reduces the contrast of the first portion of the light rays reflected off of the indicium 72 as compared to the body 54 proximate the indicium 72, which is undesired. The application of the shield 88 reduces backlighting and improves the contrast of the illuminated indicium 72 as compared to the proximate body 54.

As shown in FIG. 9, the light rays transmitted through the light guide 92 toward the secondary section 62 of the body 54 are internally reflected off of the pair of notch surfaces 96. The notch 94 and the notch surfaces 96 have an angular configuration. The reflection of the light rays off of the angularly configured notch surfaces 96 facilitates transmission of the light rays toward a pair of longitudinal portions 104 of the periphery 56 of the secondary section 62 of the body 54. Specifically, the longitudinal portions 104 are segments of the periphery 56 that longitudinally extend from the primary section 60 of the body 54 along the axis toward the lever 24.

The second portion of the light rays transmitted to the longitudinal portions 104 of the periphery 56 reflect off reflective surface 80 and transmit directly through the body 54 and out of the opening 40 for illuminating the longitudinal portions 104 of the periphery 56 of the secondary section 62 of the body 54. This illumination along the periphery 56 of the secondary section 62 of the body 54 can be aesthetically-pleasing. Furthermore, this illumination along the periphery 56 of the secondary section 62 of the body 54 in conjunction with the illumination of the indicium 72 and the periphery 56 of the primary section 60 of the body 54 can be aesthetically-pleasing.

It is to be appreciated that the light guide 92 can have a solid configuration wherein the notch surfaces 96 are removed and the notch 94 is not defined. With such a configuration, the light rays can transmit toward the entire periphery 56 of the body 54 facilitating illumination of the entire periphery 56 of the body 54. It is also to be appreciated that the indicium 72 can be disposed on the secondary section 62 of the body 54 with the reflective surfaces 80 disposed along the periphery 56 of the secondary section 62 for internally reflecting the first portion of the light rays to the indicium 72 and with the indicium 72 reflecting the first portion of the light rays out of the secondary section 62 of the body 54 for illuminating the indicium 72.

The subject invention also provides for a method for illuminating the knob 30 for the shifter assembly 20 of the vehicle. As described above, and shown in FIG. 3, the knob 30 utilizes the housing 34 having the interior surface 36 defining the cavity 38 and the opening 40 extending into the cavity 38. The knob 30 includes the body 54 at least partially disposed within the cavity 38 having a first surface 58 and a second surface 76 spaced from one another. The body 54 extends to the periphery 56 and is formed of the at least partially transparent material, as discussed above. The illumination device 50 is disposed within the cavity 38 between the interior surface 36 and the body 54. The at least one reflective surface 80 is disposed along the periphery 56 of the body 54. The at least one indicium 72 is disposed along the body 54, and the body 54 defines at least one indicium cavity 74 having a bottom 78 substantially parallel to the first surface 58 with the indicium 72 disposed within the indicium cavity 74 along the bottom 78.

The method includes the step of emitting light rays from the illumination device 50, as shown in FIG. 7. The knob 30 further includes the shield 88 disposed between the illumination device 50 and the opening 40 and formed of the at least partially opaque material. The knob 30 further includes the light guide 92 adjacent the illumination device 50. The method further includes the steps of guiding the light rays toward the periphery 56 of the body 54 with the shield 88 and directing the light rays with the light guide 92 from the illumination device 50 toward the reflective surface 80.

The method further includes the steps of reflecting the light rays off the reflective surface 80 and into the body 54, internally reflecting the first portion of the light rays within the body 54 toward the indicium 72, and reflecting the first portion of the light ray off of the indicium 72 and out of the housing 34 through the opening 40 for illuminating the indicium 72.

As discussed above, the indicium 72 have the coarse textural configuration. As such, the step of reflecting the first portion of the light ray off of the indicium 72 is further defined as reflectively scattering the first portion of the light rays off of the coarse textural configuration toward the opening 40 for illuminating the indicium 72.

The method further includes the step of transmitting the second portion of the light rays through the body 54 and out of the housing 34 through the opening 40 for illuminating the periphery 56 of the body 54, as shown in FIG. 8. The steps of internally reflecting the first portion of the light rays within the body 54 and transmitting the second portion of the light rays through the body 54 occur simultaneously.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A knob for a shifter assembly of a vehicle, said knob comprising:
    a housing having an interior surface defining a cavity and an opening extending into said cavity;
    a body at least partially disposed within said cavity having a first surface and a second surface spaced from one another with said body extending to periphery and being formed of an at least partially transparent material;
    an illumination device disposed within said cavity between said interior surface of said housing and said body for emitting light rays;
    at least one reflective surface disposed along said periphery of said body for receiving the light rays from said illumination device with a first portion of the light rays reflecting off of said reflective surface and internally reflecting within said body off of said first surface toward said second surface; and
    at least one indicium disposed along said body;
    said body defining at least one indicium cavity having a bottom substantially parallel to said first surface with said indicium disposed within said indicium cavity along said bottom for reflecting the first portion of the light rays toward said opening for illuminating said indicium;
    said at least one reflective suface being further defined as a plurality of reflective surfaces disposed and staggered about said periphery of said body.

2. A knob as set forth in claim 1 wherein said reflective surface is integral with said body for transmitting the light rays within said body.

3. A knob as set forth in claim 1 wherein said indicium has a coarse textural configuration for reflectively scattering the first portion of the light rays toward said opening for illuminating said indicium.

4. A knob as set forth in claim 1 wherein said first surface of said body faces said opening of said housing for receiving the first portion of the light rays from said reflective surface and reflecting the light ray toward said indicium.

5. A knob as set forth in claim 1 wherein said each of said plurality of reflective surface is further defined as a first reflective surface and a second reflective surface adjacent one another with said first and second reflective surfaces angularly configured for reflecting the first portion of the light rays within said body and reflecting a second portion of the light rays through said body toward said opening for illuminating said periphery.

6. A knob as set forth in claim 1 wherein said body defines a central region within said periphery with each of said plurality of reflective surfaces angled toward said central region for facilitating reflecting the first portion of light rays toward said central region.

7. A knob as set forth in claim 6 wherein said indicium are disposed in said central region with said plurality of reflective surfaces reflecting the first portion of light rays toward said central region for illuminating said indicium.

8. A knob as set forth in claim 1 further including a shield disposed within said cavity and being formed of an at least partially opaque material for inhibiting the light rays from transmitting through said shield toward said opening.

9. A knob as set forth in claim 8 wherein said shield is disposed between said illumination device and said opening for guiding the light rays toward said periphery of said body.

10. A knob as set forth in claim 8 wherein said shield defines an outer wall spaced from said interior surface of said housing with said periphery of said body disposed between said outer wall and said interior surface for facilitating transmission of the light rays from said illumination device into said body at said periphery.

11. A knob as set forth in claim 1 further including a light guide adjacent said illumination device with said light guide directing the light rays from said illumination device toward said reflective surface for illuminating said indicium.

12. A knob as set forth in claim 11 further including a shield is disposed between said light guide and said opening with said light guide directing the light rays along said shield toward said reflective suface for illuminating said indicium.

13. A knob as set forth in claim 1 wherein said housing defines a top and a side adjacent one another with said body defining a primary section disposed along said top and a secondary section disposed along said side with said illumination device transmitting the light rays to each of said primary and secondary section.

14. A knob as set forth in claim 13 wherein said primary section and said secondary section of said body are disposed transverse to each defining a contoured configuration of said body along said top and said side of said housing.

15. A shifter assembly for selecting one of plurality of gears of a transmission of a vehicle, said assembly comprising:
   a base;
   a lever having a first end and a second end opposite one another with said lever movably coupled to said base at said first end; and
   a knob coupled to said lever at said second end with said knob comprising:
      a housing having an interior surface defining a cavity and an opening extending into said cavity;
      a body at least partially disposed within said cavity having a first surface and a second surface spaced from one another with said body extending to a periphery and being formed of an at least partially transparent material;
      an illumination device disposed within said cavity between said interior surface of said housing and said body for emitting light rays;
      at least one reflective surface disposed along said periphery of said body for receiving the light rays from said illumination device with a first portion of the light rays reflecting off of said reflective suface and internally reflecting within said body off of said first surface toward said second suface; and
      at least one indicium disposed along said body;
      said body defining at least one indicium cavity having a bottom substantially parallel to said first surface with said indicium disposed within said indicium cavity along said bottom for reflecting the first portion of light rays toward said opening for illuminating said indicium;
      said at least one reflective surface being further defined as a plurality of reflective surfaces disposed and staggered about said periphery of said body.

16. A shifter assembly as set forth in claim 15 wherein said reflective suface receives the light rays from said illumination device with a second portion of the light rays transmitting through said body toward said opening for illuminating said periphery of said body.

17. A method for illuminating a knob for a shifter assembly of a vehicle utilizing a housing having an interior suface defining a cavity and an opening extending into the cavity, a body at least partially disposed within the cavity having a first surface and a second surface spaced from one another with the body extending to a periphery and being formed of an at least partially transparent material, an illumination device disposed within the cavity between the interior surface and the body, at least one reflective surface disposed along the periphery of the body, at least one indicium disposed along the body, the at least one reflective surface being further defined as a plurality of reflective surfaces disposed and staggered about the periphery of the body, and the body defining at least one indicium cavity having a bottom substantially parallel to the first surface with the indicium disposed within the indicium cavity along the bottom; the method comprising the step of:
   emitting light rays from the illumination device;
   reflecting the light rays off the plurality of reflective surfaces and within the body;
   internally reflecting a first portion of the light rays within the body toward the indicium;
   reflecting the first portion of the light ray off of the indicium and out of the housing through the opening for illuminating the indicium; and
   transmitting a second portion of the light rays through the body and out of the housing through the opening for illuminating the periphery of the body.

18. The method as set forth in claim 17 wherein the steps of internally reflecting the first portion of the light rays within the body and transmitting the second portion of the light rays through the body occur simultaneously.

19. The method as set forth in claim 17 wherein the indicium has a coarse textural configuration, and wherein the step of reflecting the first portion of the light ray off of the indicium is further defined as reflectively scattering the first portion of the light rays off of the coarse textural configuration toward the opening for illuminating the indicium.

20. The method as set forth in claim 17 further including a shield disposed between the illumination device and the opening and formed of an least partially opaque material and light guide adjacent the illumination device, and further including steps of guiding the light rays toward the periphery of the body with the shield and directing the light rays with the guide from the illumination device toward the reflective surface.

* * * * *

UNITED STATES PATENT AND TRADEMARK OFFICE
CERTIFICATE OF CORRECTION

Page 1 of 2

PATENT NO. : 9,163,719 B2
APPLICATION NO. : 14/398670
DATED : October 20, 2015
INVENTOR(S) : Viktor Farkas et al.

It is certified that error appears in the above-identified patent and that said Letters Patent is hereby corrected as shown below:

ON THE TITLE PAGE OF PATENT:

Item 60 Related U.S. Application Data section, please delete "Provisional application No. 60/642,093" and replace with -- Provisional application No. 61/642,093 --

IN THE CLAIMS:

Column 11, line 67, claim 1 please delete "at least one indicum" before "disposed" and replace with -- at least one indicium --

Column 12, line 1, claim 1 please delete "at least one indicum" before "cavity" and replace with -- at least one indicium --

Column 12, line 21, claim 5 please delete "wherein said each of said" after "Claim 1" and replace with -- wherein each of said --

Column 12, line 22, claim 5 please delete "plurality of reflective surface" before "is" and replace with -- plurality of reflective surfaces --

Column 12, line 57, claim 12 please delete "is disposed between" before "said" and replace with -- disposed between --

Column 12, line 59, claim 12 please delete "toward said reflective suface" before "for" and replace with -- toward said reflective surface --

Column 12, lines 64, claim 13 please delete "and secondary section" after "of said" and replace with -- and secondary sections --

Signed and Sealed this
Nineteenth Day of April, 2016

Michelle K. Lee
*Director of the United States Patent and Trademark Office*

CERTIFICATE OF CORRECTION (continued)

IN THE CLAIMS:

Column 13, line 1, claim 14 please delete "transverse to each defining a contoured" before "configuration" and replace with -- transverse to each other defining a contoured --

Column 13, line 3, claim 15 please delete "for selecting one of plurality" after "assembly" and replace with -- for selecting one of a plurality --

Column 13, line 4, claim 15 please delete "of a vehicle, said assembly" before "comprising" and replace with -- of a vehicle, said shifter assembly --

Column 13, line 25, claim 15 please delete "of said reflective suface" before "and internally" and replace with -- of said reflective surface --

Column 13, line 27, claim 15 please delete "said second suface" before "and" and replace with -- said second surface --

Column 13, line 32, claim 15 please delete "first portion of" after "reflecting the" and replace with -- first portion of the --

Column 13, line 44, claim 17 please delete "an interior suface" after "having" and replace with -- an interior surface --

Column 14, line 14, claim 17 please delete "the step of:" and replace with -- the steps of: --

Column 14, line 38, claim 20 please delete "of an least partially opaque" before "material" and replace with -- of an at least partially opaque --

Column 14, line 38, claim 20 please delete "partially opaque material and" after "least" and replace with -- partially opaque material and a --

Column 14, line 41, claim 20 please delete "with the" before "shield" and replace with -- with the light --